(12) United States Patent
Shirato et al.

(10) Patent No.: US 6,658,924 B2
(45) Date of Patent: Dec. 9, 2003

(54) METHOD FOR MEASURING DYNAMIC CHARACTERISTICS OF WHEEL OF VEHICLE

(75) Inventors: Soichiro Shirato, Hiratsuka (JP); Ichiro Akiyama, Hiratsuka (JP); Haruo Tuchiya, Fujisawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 116 days.

(21) Appl. No.: 09/908,818

(22) Filed: Jul. 20, 2001

(65) Prior Publication Data

US 2002/0029640 A1 Mar. 14, 2002

(30) Foreign Application Priority Data

Jan. 22, 1999 (JP) ............................. 11-14541
Jul. 21, 2000 (JP) ....................... 2000-221249

(51) Int. Cl.$^7$ ............................................ G01M 19/00
(52) U.S. Cl. ......................................... 73/118.1
(58) Field of Search ........................... 73/116, 118.1, 73/146

(56) References Cited

U.S. PATENT DOCUMENTS

| | | |
|---|---|---|
| 4,800,751 A | 1/1989 | Kobayashi et al. |
| 4,824,180 A | 4/1989 | Levrai |
| 5,127,637 A | 7/1992 | Castel |

FOREIGN PATENT DOCUMENTS

| | | |
|---|---|---|
| DE | 37 26 146 A1 | 11/1988 |
| EP | 0 236 947 A2 | 9/1987 |
| EP | 0 410 709 A1 | 1/1991 |
| GB | 2 052 078 A | 1/1981 |
| JP | 4-169827 | 6/1992 |
| JP | 06227225 A | 8/1994 |

*Primary Examiner*—Edward Lefkowitz
*Assistant Examiner*—Maurice Stevens
(74) *Attorney, Agent, or Firm*—Arent Fox Kintner Plotkin & Kahn, PLLC (57) ABSTRACT

A washer-type strain sensor, which generates an output representing a load acting thereon, is arranged between the vehicle body and the wheel. A dynamic load acting on the wheel is measured on the basis of the outputs of the strain sensor when the vehicle is traveling. A lateral force, a lateral-force coefficient, a slip angle, and steering characteristics of the wheel are obtained on the basis of the measured dynamic load, and thereby the cornering characteristics of the wheel are obtained.

9 Claims, 8 Drawing Sheets

METHOD FOR MEASURING DYNAMIC CHARACTERISTICS OF WHEEL OF VEHICLE

BACKGROUND OF THE INVENTION

1. Field of the Invention

The present invention relates to a method for measuring the dynamic characteristics of a wheel of a vehicle.

2. Description of the Related Art

There is known a method, for measuring the dynamic characteristics of a wheel of a vehicle, in which a stroke sensor is attached to a shock absorber of the vehicle for measuring a stroke of the shock absorber, dynamic load of the wheel is calculated on the basis of the measured stroke of the shock absorber, and dynamic characteristics of the wheel is obtained on the basis of the calculated dynamic load of the wheel.

However, it is difficult to calculate the dynamic load of the wheel on the basis of the stroke of the shock absorber correctly, and therefore, it is also difficult to obtain dynamic characteristics of the wheel correctly.

On the other hand, Japanese Unexamined Patent Publication No. 6-227225 discloses a suspension system, for a vehicle, in which a washer-type strain sensor, which generates an output representing load acting thereon, is arranged between vehicle body and the wheel, the dynamic load acting on the wheel is measured on the basis of the outputs of the strain sensor when the vehicle is traveling, and a load, having the same value as the measured dynamic load, but in an opposite direction with respect to the measured dynamic load, is applied to the wheel, to thereby absorb vibration of the vehicle.

This system actually measures the dynamic load acting on the wheel. However, such a measurement of the dynamic load is directed to absorb the vibration of the vehicle, rather than to obtain the dynamic characteristics of the wheel.

SUMMARY OF THE INVENTION

An object of the invention is to provide a method, for measuring dynamic characteristics of a wheel of a vehicle, which is capable of measuring the dynamic characteristics of the wheel correctly.

According to the present invention, there is provided a method for measuring the dynamic characteristics of a wheel of a vehicle, the vehicle having a vehicle body, the method comprising: providing a washer-type strain sensor having an inner bore, the strain sensor generating an output representing a load acting thereon; arranging the strain sensor between the vehicle body and the wheel; measuring the dynamic load acting on the wheel on the basis of the outputs of the strain sensor when the vehicle is traveling; and obtaining dynamic characteristics of the wheel on the basis of the measured dynamic load.

The present invention may by more fully understood from the description of the preferred embodiments of the invention as set forth below, together with the accompanying drawings.

DESCRIPTION OF THE PREFERRED EMBODIMENTS

The following explanation is made regarding an embodiment in which the present invention is applied to an automobile having four wheels. Alternatively, the present invention may be applied to a vehicle having two, three, or more than four wheels.

Figure 1:
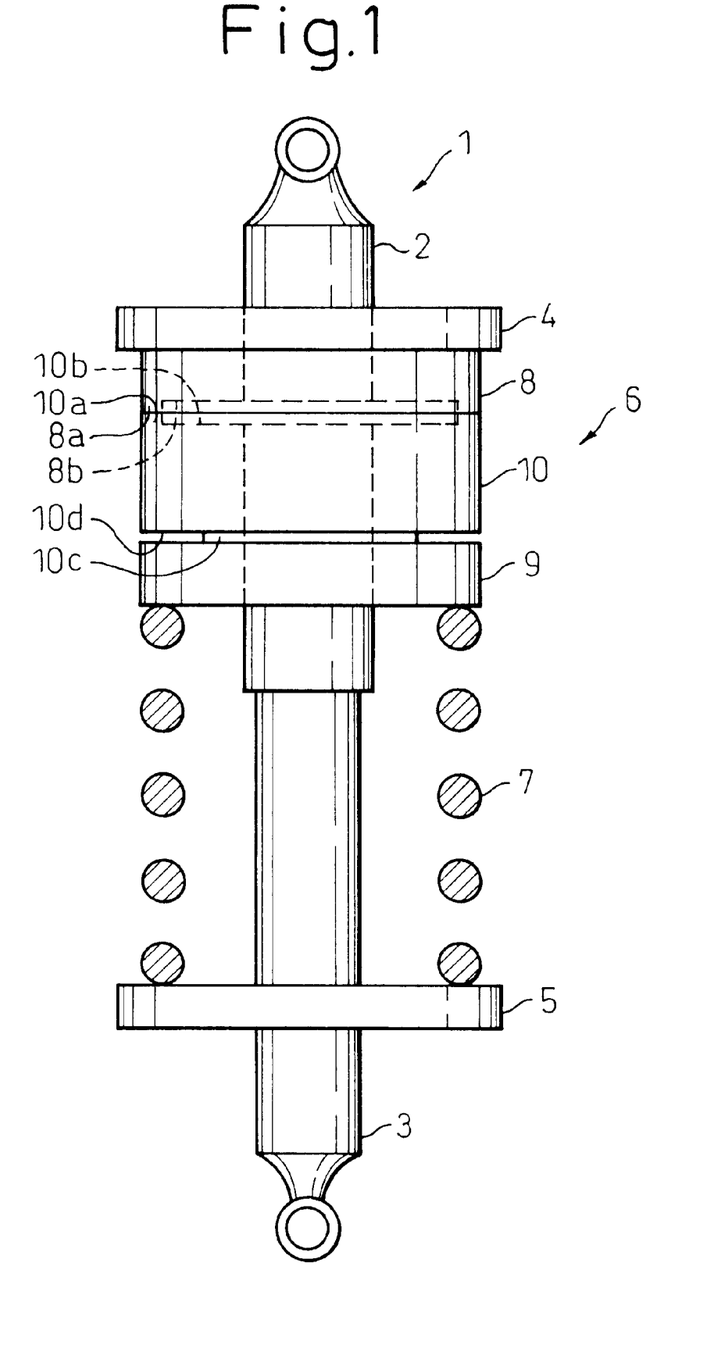
FIG. 1 is a schematic illustration of a sensor assembly adapted to be incorporated in a suspension system of an automobile.

Referring to FIG. 1, reference numeral 1 designates a shock absorber which constitutes a suspension or damper system of the automobile. The shock absorber 1 comprises upper and lower parts 2 and 3, which are telescopically arranged. The upper part 2 is connected to a cross member (not shown) of a body frame of the automobile at its top end, and the lower part 3 is connected to a lower arm (not shown) at its lower end. The lower arm is connected to a wheel or tire via an axle (not shown).

Upper and lower seats 4 and 5 in a form of a flange are fixedly connected to the upper and lower parts 2 and 3, respectively. A sensor assembly 6 and a compressed coil spring 7 are inserted between the upper and lower seats 4 and 5 and are concentric and movable with respect to the shock absorber 1.

The sensor assembly 6 comprises a first annular attachment 8 arranged on a side of the upper seat 4, a second annular attachment 9 arranged on a side of the top end of the coil spring 7, and a washer-type strain sensor 10 inserted between the first and second attachments 8 and 9. As shown in FIG. 1, the shock absorber 1 extends through inner bores of the attachments 8 and 9 and the strain sensor 10.

Figure 2A:
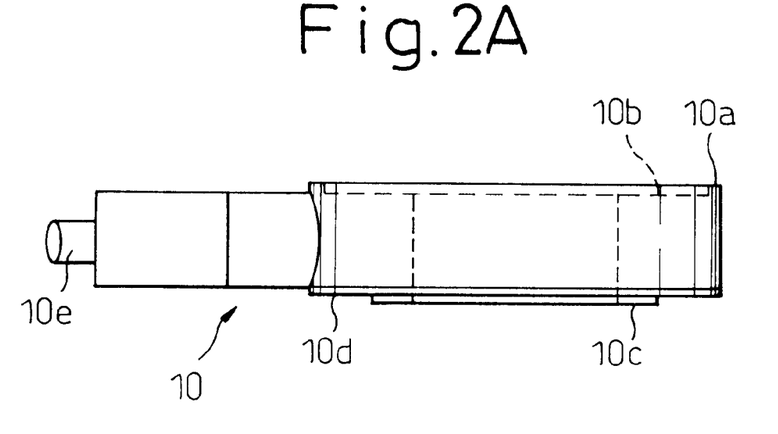
FIG. 2A is a side view of a washer-type strain sensor.
Figure 2B:
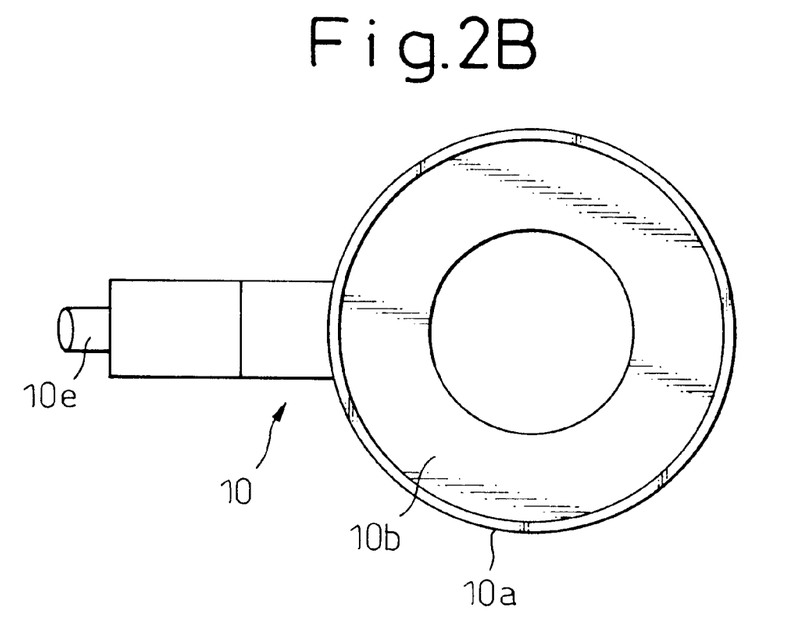
FIG. 2B is a top plan view of a washer-type strain sensor.

Referring to FIGS. 1, 2A, and 2B, a bottom surface of the first attachment 8, which faces the strain sensor 10, includes an annular, flat protrusion 8a at its periphery, and a flat depression 8b at its center. As in the same manner, a top surface of the strain sensor 10, which faces the first attachment 8a, includes an annular, flat protrusion 10a at its periphery, and a flat depression 10b at its center. Therefore, the first attachment 8a and the strain sensor 10 will contact with each other at their protrusions 8a and 10a. This avoids an undesirable contact of the first attachment 8a with the strain sensor 10, even if the strain sensor 10 itself is deformed in use, which, in turn, reduces measurement errors.

On the other hand, a bottom surface of the strain sensor 10, which faces the second attachment 9, includes a flat protrusion 10c at its center, and an annular, flat depression 10d at its periphery. Therefore, the strain sensor 10 will contact the flat top surface of the second attachment 9 at its protrusion 10c.

Load acting on the tire will expand and shrink the shock absorber 1 and the spring 7 according to the value of the load. The load is applied to the strain sensor 10 via the second attachment 9. In this respect, the sensor assembly 6 or the strain sensor 10 is arranged in a position where it receives the load acting on the tire. The flat protrusion 10c of the strain sensor 10 will form a load input surface, in this embodiment. Note that output of the strain sensor 10 is output via a wire 10e.

Considering that the spring 7 is conventionally inserted between the upper and lower seats 4, 5, the sensor assembly 6 is inserted between the upper seat 4 and the spring 7 in this embodiment. Alternatively, the sensor assembly 6 may be inserted between the spring 7 and the lower seat 5. A stroke sensor may be attached between the upper and lower seats 4, 5 to measure the stroke of the shock absorber 1 or of the spring 7.

Figure 3:
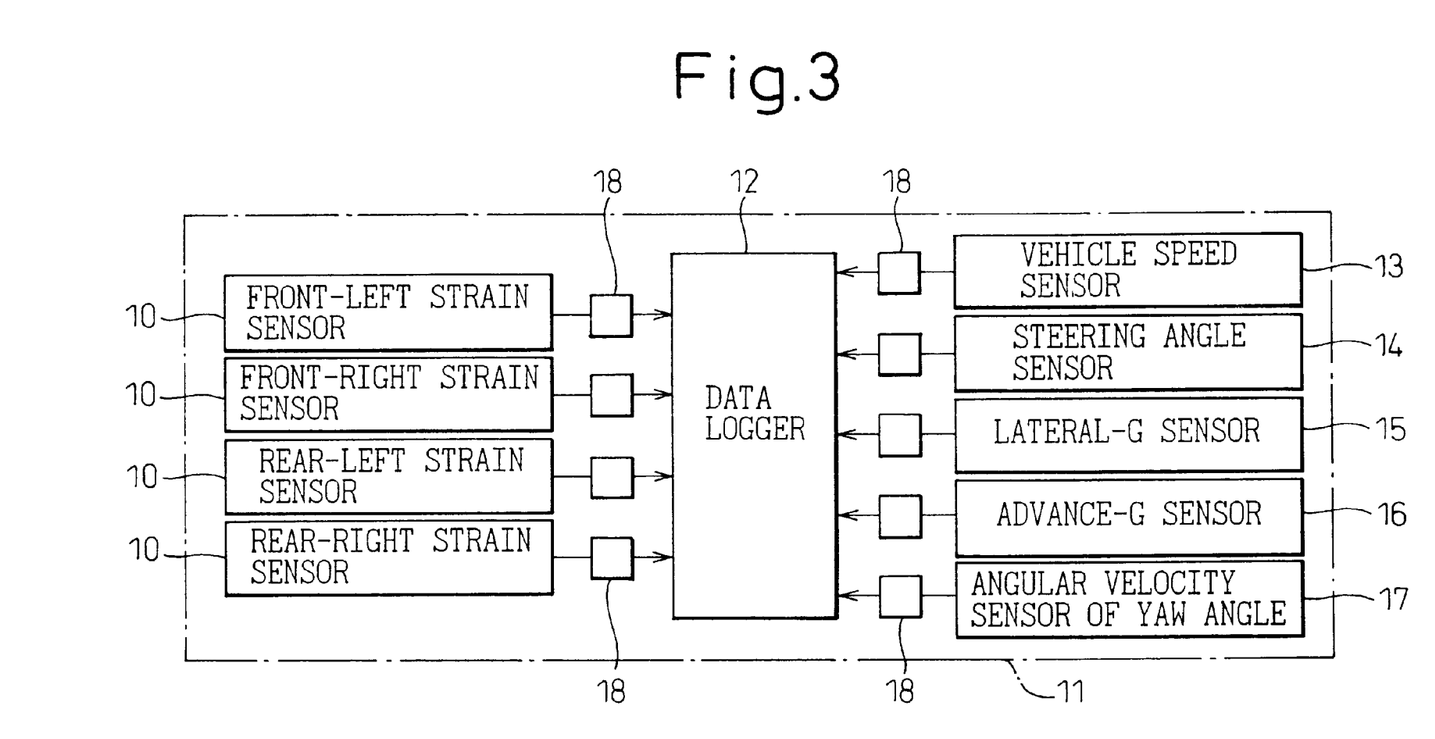
FIG. 3 is a schematic illustration of a system for measuring the dynamic characteristics of the tires of a practical vehicle.

FIG. 3 is a general view of a measurement system 11 for measuring the dynamic characteristics of the tires of a practical vehicle. Referring to FIG. 3, the measurement system 11 comprises a data logger 12 for storing input data, strain sensors 10, a vehicle speed sensor 13, a steering angle sensor 14, a lateral-G sensor 15, an advance-G sensor 16, and an angular velocity sensor for yaw angle 17.

Each strain sensor is formed by a load cell which generates an output voltage representing the load acting thereon. The strain sensors 10 are incorporated into front-left, front-right, rear-left, and rear-right shock absorbers 1 of the automobile, respectively, in a form of the sensor assembly 6 mentioned above. The vehicle speed sensor 13 is attached to an inside of a brake caliper (not shown) of the automobile, and generates an output voltage representing the speed of the automobile. The steering angle sensor 14 is attached to a steering stroke rod (not shown) of the automobile, and generates output a voltage representing the steering angle of the automobile.

The lateral-G sensor 15 generates output voltages representing a gravitational acceleration in a lateral direction of the automobile, i.e., a lateral-G, and the advance-G sensor 16 generates output voltages representing a gravitational acceleration in a back-and forth direction of the automobile, i.e., an advance-G. The angular velocity sensor of yaw angle 17 generates output voltages representing a yaw angle of the automobile. The lateral-G sensor 15, advance-G sensor 16, and the yaw angle velocity sensor 17 are arranged on a longitudinal center axis of the automobile at a position as close to the center of gravity of the automobile as possible.

The output voltages of the sensors are input to the data logger 12 via corresponding amplifiers 18, every a predetermined time intervals, such as multiples of 10 ms. Note that the measurement system 11 is mounted on the automobile. In particular, the data logger 12 is arranged in a position, in the automobile, where no heat is generated.

Next, an explanation of a method for measuring the dynamic characteristics of tires of the practical automobile, according to the present embodiment, will be made with reference to a routine for measuring dynamic characteristics of the tires of the practical automobile shown in FIG. 4A.

Figure 4A:
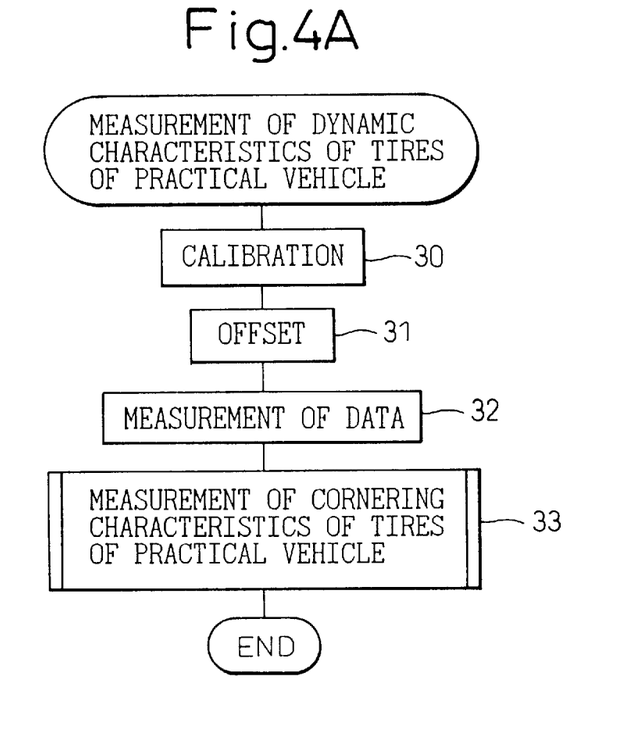
FIG. 4A is a flow chart for measuring the dynamic characteristics of the tires of a practical vehicle.

Referring to FIG. 4A, first, in step 30, calibration of the strain sensors 10 is performed before they are incorporated into the automobile. Specifically, a known load is applied to the strain sensors 10, and the output voltages at this state are stored. This procedure is repeated using different amount of loads, for example 10 loads, and thereby the relationship between the known loads and the output voltage of the strain sensors 10 are obtained in the form of, for example, a linear regression equation.

In the following step 31, an offset of the output of the strain sensors 10 is performed after the sensors 10 are incorporated into the automobile. Specifically, first, each tire is positioned on a load indicator. The linear regression equation obtained as above is offset so that the load obtained on the basis of the outputs of the strain sensor 10 conforms to the load indicated by the load indicator.

In the following step 32, a measurement of data is performed. Specifically, the automobile travels a predetermined course, such as a racing circuit, during which the dynamic load, the vehicle speed, the steering angle, the lateral-G, the advance-G, and the yaw angle velocity are measured. The measurement data are stored together with the position of the automobile in the racing circuit, and gathered up in a form of a data set whenever the automobile laps the racing circuit.

Figure 4B:
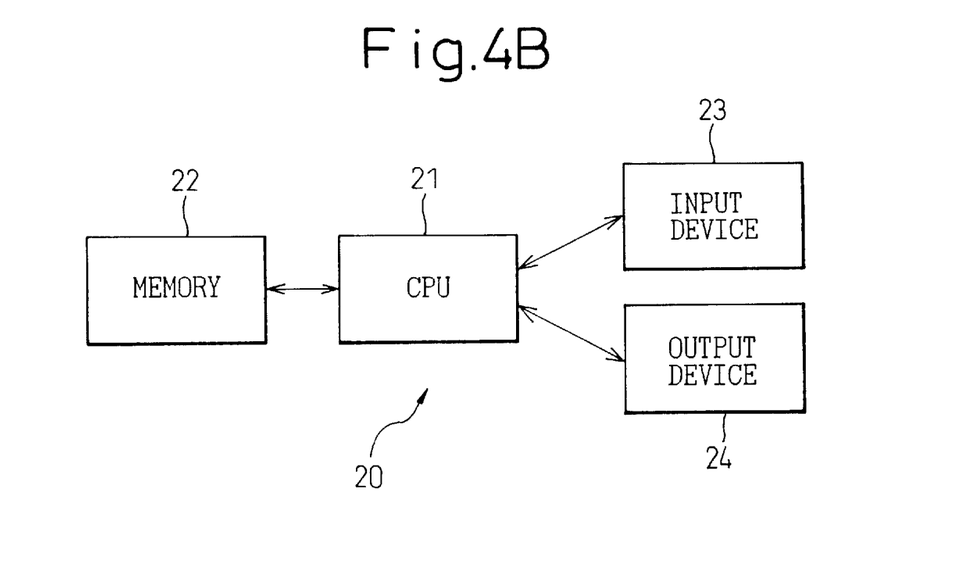
FIG. 4B is a schematic illustration of an outside computer.

In the following step 33, dynamic characteristics, such as cornering characteristics, of the tires of the practical vehicle are measured on the basis of the measurement data obtained as above. Such a measurement may be performed in a computer 20, as schematically illustrated in FIG. 4B, arranged outside of the automobile. In this case, the measurement data are transferred from the data logger 12 to the outside computer. The outside computer 20 comprises CPU 21, a memory 22, an input device 23, and an output device 24 including a display.

Figure 5:
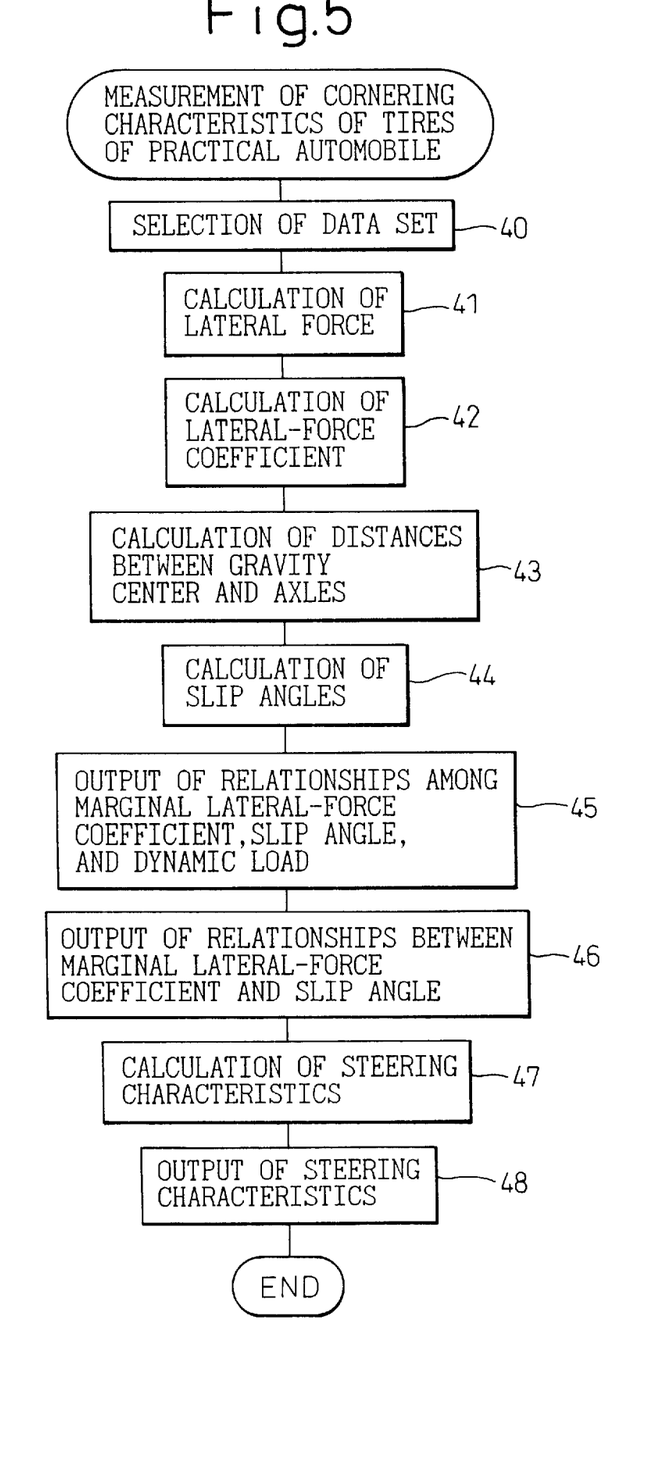
FIG. 5 is a flow chart for measuring the cornering characteristics of the tires of a practical vehicle.

FIG. 5 illustrates a routine for executing a measurement of cornering characteristics of the tires of the practical automobile, using the outside computer 20.

Referring to FIG. 5, first, in step 40, a data set to be used for a measurement of cornering characteristics of the tires is selected from the stored measurement data. In this embodiment, a data set obtained when the automobile travels the entire course of the racing circuit with the minimum lap time, is selected, and cornering characteristics of the tires are measured on the basis of the selected data set. This allows all of the selected lateral-G to be considered as a marginal or maximum lateral-G which depends on configurations of the racing circuit or the like.

In the following step 41, a lateral force is calculated. The lateral force in this embodiment is a force generating at a point where the tire contacts with the road surface, in a direction perpendicular to a traveling direction of the automobile, when the automobile is assumed to travel with the marginal lateral-G. The lateral force is one of indexes representing cornering characteristics of the tires of the practical automobile, and is calculated using the following equation:

LATERAL FORCE=LATERAL-G·STATIC LOAD

In the following step 42, a lateral-force coefficient (friction coefficient) between the tire and the road surface, is calculated using the following equation:

LATERAL-FORCE COEFFICIENT = LATERAL FORCE/ DYNAMIC LOAD

= LATERAL FORCE ·

STATIC LOAD/

DYNAMIC LOAD

In steps 41 and 42, when calculating a lateral force and a lateral-force coefficient regarding a single tire, the static load and the dynamic load acting on the corresponding tire are used as "STATIC LOAD" and "DYNAMIC LOAD", respectively. When calculating a lateral force and a lateral-force coefficient regarding front tires (front-left and front-right tires), a sum of static loads (front static load) and a sum of dynamic loads (front dynamic load), respectively acting on the front tires, are used. In the same manner, when calculating a lateral force and a lateral-force coefficient regarding rear tires (rear-left and rear-right tires), a sum of static loads (rear static load) and a sum of dynamic loads (rear dynamic load), respectively acting on the rear tires, are used. When calculating a lateral force and a lateral-force coefficient regarding all of the tires, a sum of static loads (total static load) and a sum of dynamic loads (total dynamic load), respectively acting on four tires, are used. Note that the lateral-G obtained in this embodiment can be considered as a marginal lateral-G, as mentioned above. Therefore, a lateral-force coefficient calculated in the step 42 can be considered as a marginal lateral-force coefficient.

In the following step 43, a distance Lf between the center of gravity of the automobile and a front axle of the automobile, and a distance Lr between the center of gravity of the automobile and a rear axle of the automobile, are calculated using the following equations, respectively:

Lf=(REAR DYNAMIC LOAD/TOTAL DYNAMIC LOAD)·WHEELBASE

Lr=(FRONT DYNAMIC LOAD/TOTAL DYNAMIC LOAD)·WHEELBASE

A position of the gravity center will vary in accordance with a traveling condition of the automobile, and thus the distances between the gravity center and the axles will also vary. However, in this embodiment, the distances between the gravity center and the axles are calculated on the basis of the measured dynamic loads, and therefore, are correctly calculated.

In the following step 44, front and rear slip angles βf and βr, when the automobile is assumed to be traveling along a circular path in a steady condition, are calculated using the following equations:

$\beta f = -\gamma \cdot Lf/V + \theta/N$ $\beta r = \gamma \cdot Lr/V$ where γ represents a yaw angle velocity, V represents a vehicle speed, θ represents a steering angle, and N represents a ratio of the steering gear.

In the following step 45, relationships among the marginal lateral-force coefficient calculated in step 42, the front or rear slip angle calculated in step 44, and the measured dynamic load, are obtained and output in a form of a graph, for example. The relationships are those of indexes representing cornering characteristics of the tires of the practical automobile.

Figure 6:
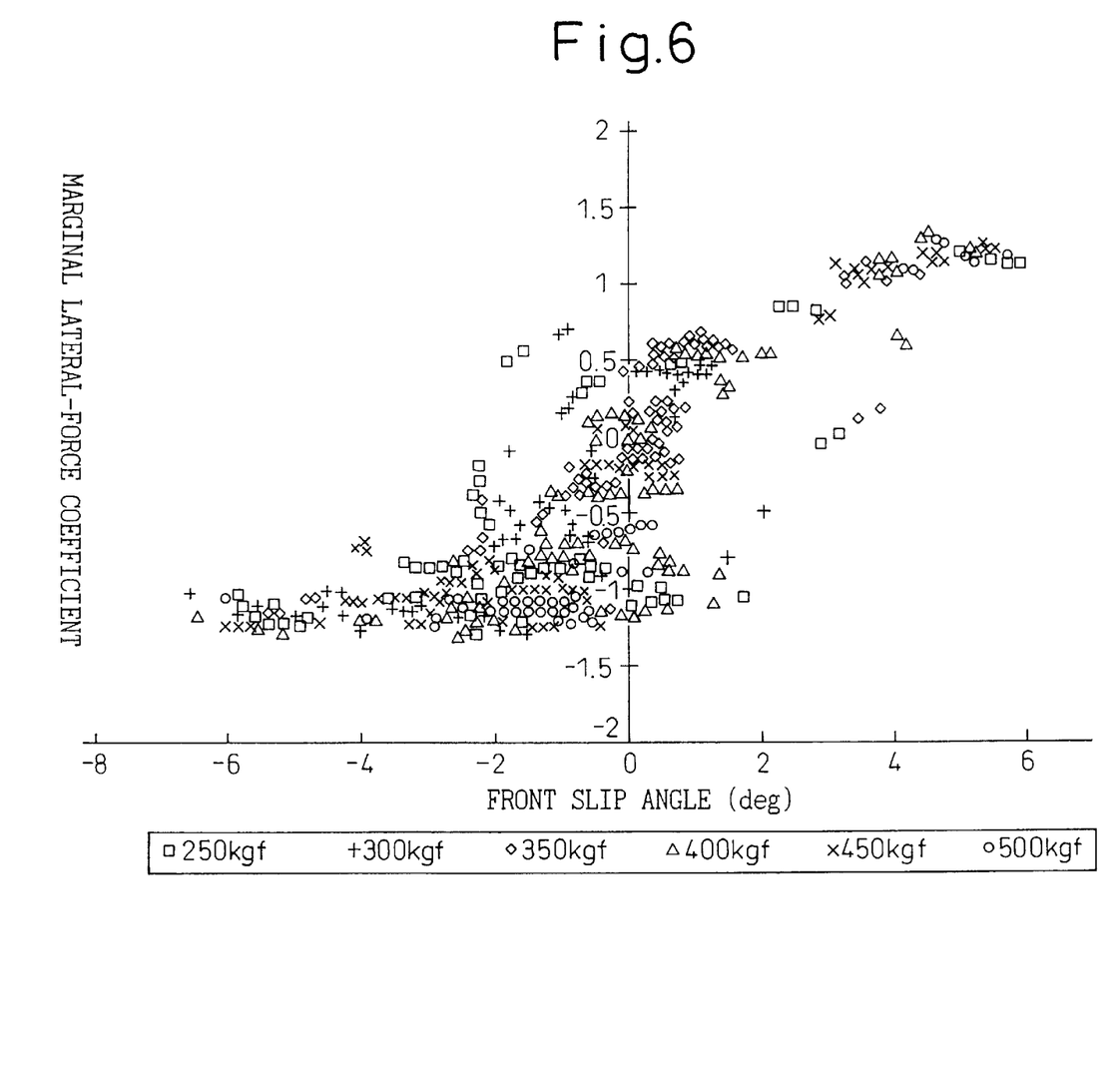
FIG. 6 is a graph illustrating an example of relationships among a marginal lateral-force coefficient, a front slip angle, and dynamic load.

FIG. 6 is an example of a graph illustrating the relationships among the marginal lateral-force coefficient, the front slip angle, and the measured dynamic load. A procedure for obtaining the graph is briefly explained as follows. First, data of the dynamic load of the front-left or front-right tire, which belong to predetermined ranges of dynamic load, are picked up from data set selected in the step 40. Then, the marginal lateral-force coefficients and the front slip angles which are obtained using the picked-up dynamic loads and relevant parameters, are also picked up. Then, the pick-up data are plotted according to its marginal lateral-force coefficient and the front slip angle, while the dynamic load range to which the pick-up dynamic load belongs can be also found.

Specifically, in the example shown in FIG. 6, six (6) ranges of dynamic load are predetermined: 250±10 kgf (2.45±0.10 kN); 300±10 kgf (2.94±0.10 kN); 350 ±10 kgf (3.43±0.10 kN); 400±10 kgf (3.92±0.10 kN); 450±10 kgf (4.41±0.10 kN); and 500±10 kgf (4.90±0.10 kN). The data belonging to one of the ranges are picked up and plotted using respective marks ("□", "+", "◇", "Δ", "×", and "○").

The marginal lateral-force coefficient represents a lateral force normalized by the dynamic load. Therefore, the relationships among the marginal lateral-force coefficient, the slip angle, and the dynamic load (the dynamic load range) is one of the indexes representing cornering characteristics of the tires of the practical automobile. The relationships also represents dependencies of the marginal lateral-force coefficient and the slip angle on the dynamic load. The provision of such relationships will allow the dynamic load (the dynamic load range) and the slip angle to be easily obtained from a specific, normalized lateral force.

Referring to FIG. 5 again, in the following step 46, relationships between the marginal lateral-force coefficient calculated in step 42, and the front or rear slip angle calculated in step 44, are obtained and output in a form of a graph, for example. The relationships are also those of indexes representing cornering characteristics of the tires of the practical automobile.

Figure 7:
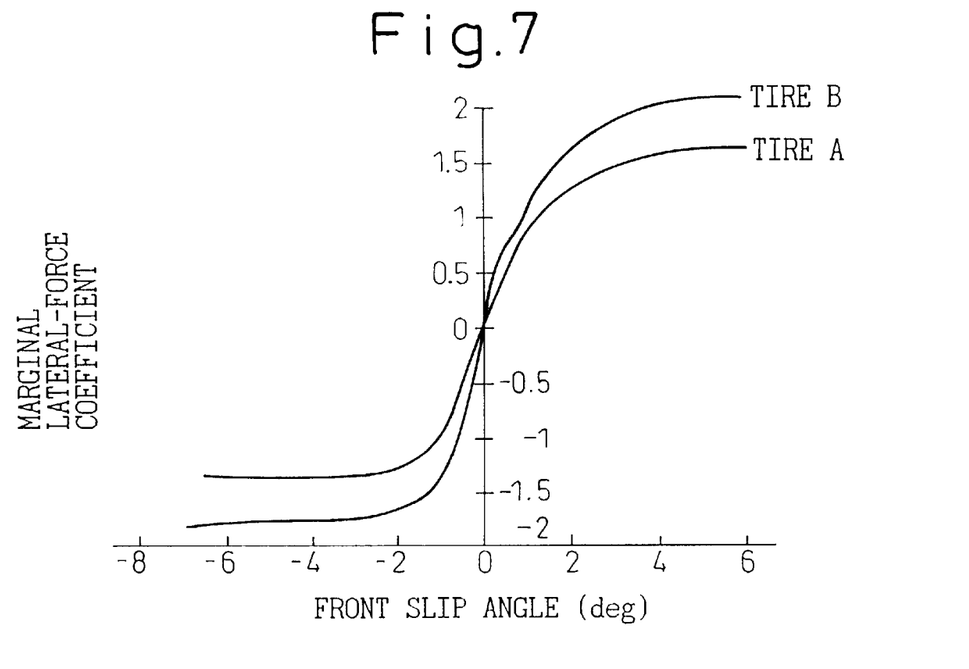
FIG. 7 is a graph illustrating an example of relationships between a marginal lateral-force coefficient and a front slip angle, for different tires.

FIG. 7 is an example of a graph illustrating the relationships between the marginal lateral-force coefficient and the slip angle. Curves drawn in FIG. 7 are obtained by approximation of plots in FIG. 6. In the example shown in FIG. 7, the curves represent the relationships regarding two kind of tires A and B.

In this way, cornering characteristics of the tire are represented by a single curve. This allows an easy comparison of cornering characteristics of tires having different specifications. Specifically, cornering characteristics of tires becomes more superior, as a slope of the curve around a point where the front slip angle is zero becomes larger. Accordingly, in the example in FIG. 7, it can be seen that the tire B has a superior cornering characteristics compared to the tire A.

Figure 8:
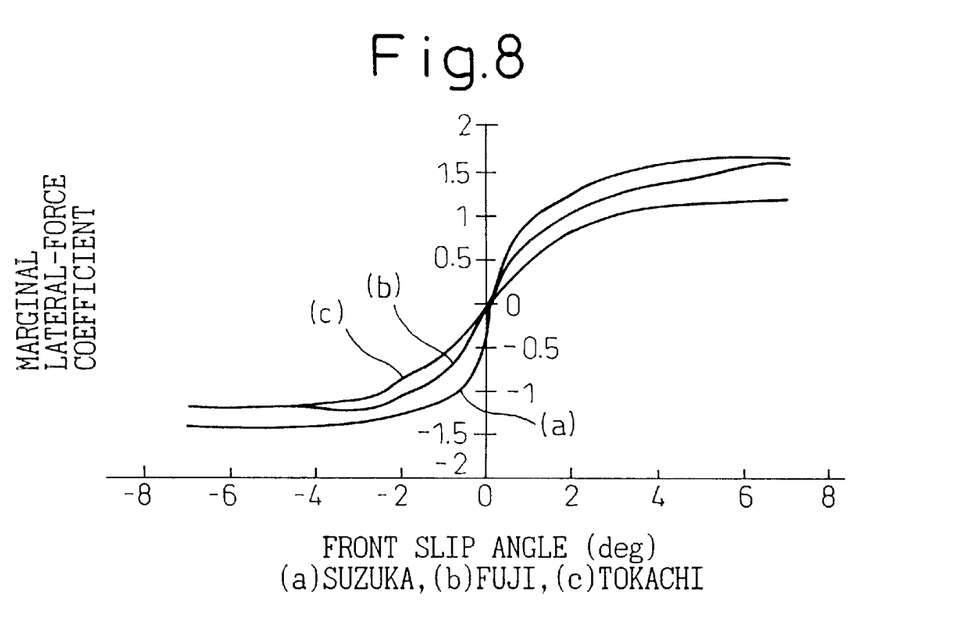
FIG. 8 is a graph illustrating another example of relationships between a marginal lateral-force coefficient and a front slip angle, for different racing circuit.

The relationships between the marginal lateral-force coefficient and the front slip angle may be obtained for different racing circuits, and may be compared with each other. FIG. 8 is an example showing such a comparison, in which the relationships of (a) SUZUKA, (b) FUJI, and (c) TOKACHI racing circuits, are compared with each other. In this way, a ranking of racing circuits with respect to the marginal lateral-force coefficient is easily obtained.

Referring to FIG. 5 again, in the following step 47, the steering characteristics Δβ are calculated using the following equation:

$\Delta\beta = (|\beta f| - |\beta r|) \cdot (\beta f \cdot \beta r) / |\beta f \cdot \beta r|$ It can be seen that the tire is in an understeering condition when Δβ>0, and in an oversteering condition when Δβ<0.

Figure 9:
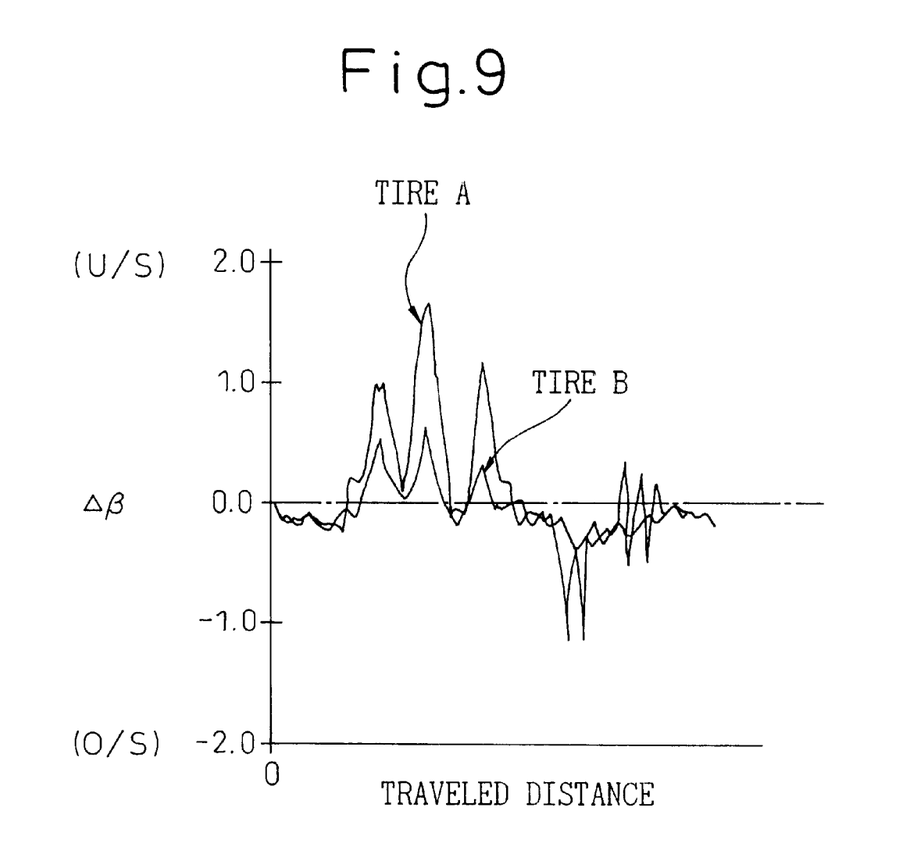
FIG. 9 is a graph illustrating an example of steering characteristics.

In the following step 48, the steering characteristic Δβ is output in a form of a graph, for example. FIG. 9 is an example of the graph. In FIG. 9, an ordinate represents the steering characteristics $\Delta\beta$, and an abscissa represents the traveled distance of the automobile from the start point of the measurement. Also, in FIG. 9, the steering characteristics for two tires A and B are illustrated.

Illustration of the steering characteristics in a form of a graph, in this way, allows easy comparison of the steering characteristics of tires having different specifications. Specifically, the drivability is enhanced was the absolute value of the steering characteristics $\Delta\beta$ becomes smaller and $\Delta\beta>0$. Accordingly, in the example in FIG. 9, it can be seen that the tire B has a better drivability than the tire A.

Note that, in FIGS. 6 to 9, the used automobile was Corona Exiv (Trademark), available from Toyota Motor Co., and the used strain sensors were washer-type load cells, available from Kyowa Dengyo Co., No. LCW-CS (for 2 tons). The size of the used front and rear tires was 210/650R18, the rim size of each tire was 8.2J×18, and pneumatic pressure of each tire was 160 kPa.

In the embodiment mentioned above, the cornering characteristics of the tires are evaluated by the lateral force, the relationships among the marginal lateral-force coefficient, the front or rear slip angle, and the dynamic load, and the relationships between the marginal lateral-force coefficient and the front or rear slip angle, or the steering characteristics. Alternatively, the cornering characteristics of the tires may be evaluated by other parameters or relationships.

Note that the strain sensors 10 are incorporated into all the tires of the automobile in the embodiment mentioned above. Alternatively, the strain sensors may be incorporated into only the front or only the rear tires. In addition, in the above-mentioned embodiment, the dynamic characteristics of the tires are measured using the measured data obtained while the automobile travels the entire racing circuit. Alternatively, the dynamic characteristics may be measured using the measured data obtained when the automobile travels a part of the racing circuit.

According to the present invention, it is possible to provide a method, for measuring the dynamic characteristics of a wheel of a vehicle, which is capable of measuring the dynamic characteristics of the wheel correctly.

While the invention has been described by reference to specific embodiments chosen for purposes of illustration, it should be apparent that numerous modifications could be made thereto by those skilled in the art without departing from the basic concept and scope of the invention.

What is claimed is:

1. A method for measuring dynamic characteristics of a wheel of a vehicle, the vehicle having a vehicle body, the method comprising:

providing a washer shaped strain sensor having an inner bore, the strain sensor generating an output representing a load acting on the strain sensor;

arranging the strain sensor between the vehicle body and the wheel;

measuring the dynamic load acting on the wheel based on the outputs of the strain sensor when the vehicle is traveling; and obtaining dynamic characteristics of the wheel based on the measured dynamic load, wherein cornering characteristics of the wheel are obtained based on the measured dynamic load, the vehicle having front and rear wheel and front and rear axles, wherein slip angles of the front and rear wheels are respectively obtained, and wherein steering characteristics of the wheel are obtained based on the slip angles of the front and rear wheels.

2. A method according to claim 1, wherein a lateral-force coefficient of the wheel is obtained based on the measured dynamic load.

3. A method according to claim 2, wherein a slip angle of the wheel is obtained, wherein relationships between the slip angle and the lateral-force coefficient are obtained, and wherein the relationships are at least indexes representing the cornering characteristics of the wheel.

4. A method according to claim 3, wherein the relationships also represent dependencies of the lateral-force coefficient and the slip angle on the measured dynamic load.

5. A method according to claim 3, wherein the relationships among the slip angle, the lateral-force coefficient, and the measure dynamic load, are obtained.

6. A method according to claim 5, wherein the relationships also represent dependencies of the lateral-force coefficient and the slip angle on the measured dynamic load.

7. A method according to claim 1, wherein distances between a center of gravity of the vehicle and the front and rear axles are respectively obtained on the basis of the measured dynamic load, and wherein the slip angles are obtained based on the respective distances.

8. A method according to claim 1, the vehicle having a shock absorber, wherein the strain sensor is arranged so that the shock absorber extends through the inner bore of the strain sensor and the first and second annular attachments of the sensor assembly.

9. A method according to claim 8, wherein a coil spring, having ends, is arranged concentrically with respect to the shock absorber, and wherein the sensor assembly is arranged between one end of the coil spring and the vehicle body or the wheel.

* * * * *